(No Model.)
L. VAN VESTRAUT.
APPARATUS FOR CHARGING INCLINED GAS RETORTS.
No. 426,483. Patented Apr. 29, 1890.
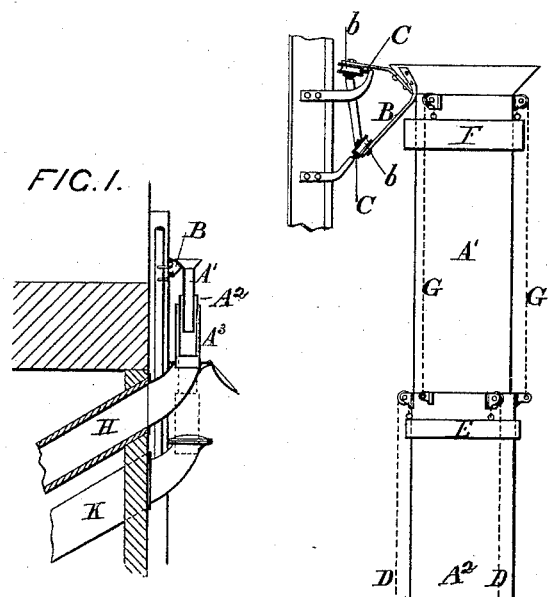
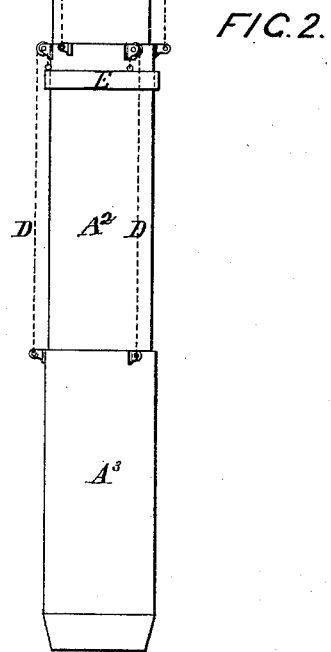
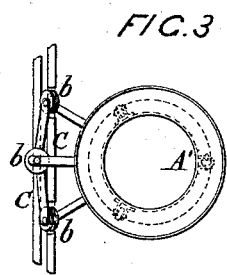
Witnesses:
E. B. Bolton
H. debrs
Inventor:
Ludovic van Vestraut
By Richards & Co.
his Attorneys.

UNITED STATES PATENT OFFICE.

LUDOVIC VAN VESTRAUT, OF SOUTHALL, COUNTY OF MIDDLESEX, ASSIGNOR OF ONE-HALF TO JAMES HUSBAND, OF BRENTFORD, ENGLAND.

APPARATUS FOR CHARGING INCLINED GAS-RETORTS.

SPECIFICATION forming part of Letters Patent No. 426,483, dated April 29, 1890.

Application filed November 5, 1889. Serial No. 329,330. (No model.)

*To all whom it may concern:*

Be it known that I, LUDOVIC VAN VESTRAUT, gas-engineer, a citizen of England, residing at Southall, in the county of Middlesex, England, have invented a new and useful Apparatus for Charging Inclined Gas-Retorts, of which the following is a specification.

In setting inclined gas-retorts they present their upper mouths at different heights and in different vertical rows.

My invention relates to means of charging retorts so set by the use of a chute, which can be adjusted in length and in position so as to conduct the coal from a supply above to the mouth of any one of the group of retorts. For this purpose at a convenient height above the highest tier of retort-mouths I provide a frame or carriage that can be moved on rollers horizontally along suitable rails, and from this carriage I suspend a tubular chute, which is made in several sections fitted to slide freely along one another like the tubes of a telescope. I balance each movable section by counter-weights attached to chains passing over pulleys mounted on the next higher section. When it is desired to charge any one of the retorts, its mouth is opened, the carriage is run along the rails until the chute comes vertically over the retort-mouth, and its sections are slid telescopically until the lowest one reaches the mouth, whereupon coals can be delivered into the upper end of the chute, so as to descend it into the retort.

Figure 1 of the accompanying drawings is a part vertical section showing portions of two inclined retorts, to the charging of which a chute, according to this invention, is applied. Fig. 2 is an elevation, and Fig. 3 is a plan, of the chute to an enlarged scale.

The chute, as shown, consists of a tube made in three lengths or sections $A'$ $A^2$ $A^3$, of which $A^2$ can slide freely along $A'$, and $A^3$ can slide freely along $A^2$. The highest length $A'$ is carried by a carriage B, having rollers $b$, which run along rail C. The lowest length $A^3$ is connected to a counter-weight E by three or more chains D, passing over pulleys mounted at the upper end of the length $A^2$, and the length $A^2$ is similarly connected to a counter-weight F by three or more chains G, passing over pulleys mounted at the upper end of $A'$ or on the carriage B. The counter-weights E and F may be made, as shown, in the form of rings. In Fig. 1 the chute is shown in position for charging the uppermost H of a row of inclined retorts. The dotted lines $A^4$ indicate the chute extended to charge a lower retort K. The retorts being arranged in several vertical rows, the chute can be moved by running the carriage B along the rails, so as to come immediately above a retort in any vertical row, and it can be extended telescopically to reach the mouth of the retort.

Although I have shown the chute as made in three lengths or sections, it might obviously be made in two lengths, or in a number of lengths greater than three.

Having thus described the nature of my invention and the best means I know for carrying the same into practical effect, I claim—

The combination of the telescopic chute in three sections $A'$, $A^2$, and $A^3$, sliding loosely into each other, with the loose-ring counter-weights E and F and the chains D and G, running over pulleys for the purpose of balancing and adjusting the chute to any height to charge inclined retorts, substantially as described.

In testimony whereof I have signed my name to this specification, in the presence of two subscribing witnesses, this 18th day of October, A. D. 1889.

L. VAN VESTRAUT.

Witnesses:
 OLIVER IMRAY,
*Patent Agent, 28 Southampton Buildings, London, W. C.*
 JNO. P. M. MILLARD,
*Clerk to Messrs. Abel & Imray, Consulting Engineers and Patent Agents, 28 Southampton Buildings, London, W. C.*